(No Model.)
M. SCHEID.
MEASURING SPOON.
No. 464,393.  Patented Dec. 1, 1891.
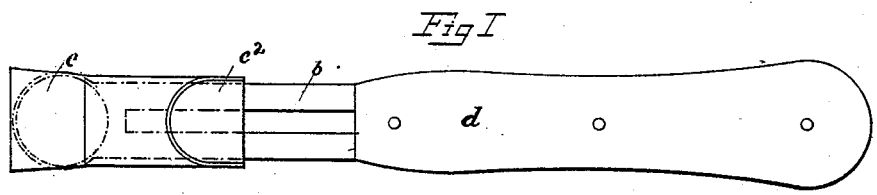
Fig I.
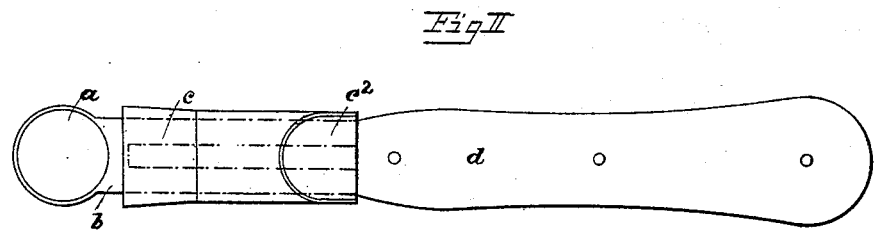
Fig II.
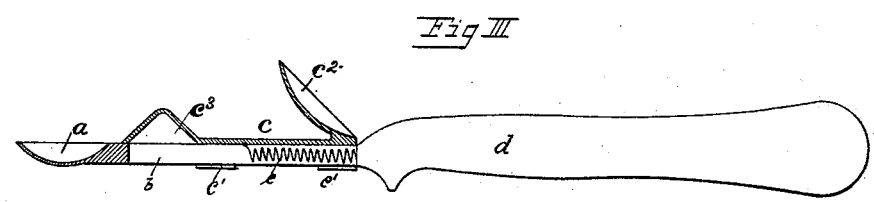
Fig III.
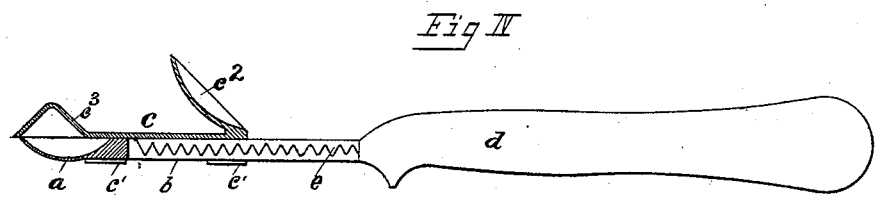
Fig IV.
Witnesses:
J. L. Wilson
Percy C. Bowen
Inventor
Max Scheid
by
Whitman & Wilkinson,
Attorneys

UNITED STATES PATENT OFFICE.

MAX SCHEID, OF WADGASSEN, GERMANY.

MEASURING-SPOON.

SPECIFICATION forming part of Letters Patent No. 464,393, dated December 1, 1891.

Application filed May 13, 1891. Serial No. 392,645. (No model.)

*To all whom it may concern:*

Be it known that I, MAX SCHEID, manufacturer, and a resident of Wadgassen, in the Kingdom of Prussia and German Empire, have invented new and useful Improvements in Measuring-Spoons with Straight Edges, of which the following is a specification, reference being had therein to the accompanying drawings.

This invention refers to improvements in or connected with spoons, whereby accurate measuring of pulverized or like substances can be readily and conveniently effected, the operator using one hand only.

In the ceramic and glass industries and in chemical and pharmaceutical laboratories and for other purposes it is often required to form a number of equal determinations of small quantities of finely-pulverized or like substances. Weighing out the quantities takes up much time, and if the quantities are apportioned by measure under the methods now in use both hands of the operator are required, and the left hand is usually found to be very awkward in making accurate measurements.

According to my invention I overcome the above objections by providing the spoon with a leveling device, as hereinafter described.

The annexed drawings show a spoon provided with the improvements according to this invention.

Figure I is a plan of the spoon with the leveling device extended. Fig. II is a plan of the spoon with the leveling device withdrawn. Fig. III is a side elevation, partly in section, of the spoon, showing the leveling device withdrawn. Fig. IV is a side elevation, partly in section, showing the leveling device extended.

The spoon consists, mainly, of the measuring-receptacle $a$, which is connected to a handle $d$ by means of a slide frame $b$. On the frame $b$ there is provided the leveling device $c$, which fits loosely onto the frame $b$ by means of the guides $c'$. The device $c$ is connected to the handle $d$ by means of the spiral spring $e$, one end of which is fixed to the device $c$, the other being fixed to the handle $d$. At the back of the device $c$ there is provided a pusher or thumb-lug $c^2$, and its forward end is provided with an upward curve $c^3$, which prevents the adhering of the particles of material to be measured to the under side thereof and allows a sharp clean cut.

In use the handle $d$ is held in the hand of the user, the normal position of the leveling device being that shown in Fig. 2. The measuring-receptacle $a$ is dipped into the substance to be separated and then taken out with a charge, and the leveling device $c$ is passed over the receptacle $a$ by pressing on the pusher $c^2$ with the thumb into the position shown in Fig. 1. In order to empty the measured substance from the receptacle $a$ the thumb is removed from the pusher $c^2$ and the device $c$ is brought to its normal position by the spring $e$ and the contents can be turned out, and the spoon is ready for another operation. In this way it is possible with one hand to make repeated apportionments of pulverized or like substances.

What I claim, and desire to secure by Letters Patent of the United States, is—

1. In a measuring-spoon, the combination, with the measuring-receptacle, of a sliding leveling device having a curved recess in rear of the cutting-edge thereof, substantially as and for the purposes described.

2. In a measuring-spoon, the combination, with the measuring-receptacle, of a handle attached to said receptacle, a spring recoil-frame moving on said handle, a curved thumb-lug attached to the rear end of said frame, and a leveling device having a straight cutting-edge in front thereof and a curved recess behind the said cutting-edge, substantially as and for the purposes described.

In witness whereof I have hereunto set my hand in presence of two witnesses.

MAX SCHEID.

Witnesses:
PHILIP BENARD,
JOSEPH KEMP.